United States Patent [19]
Baylor et al.

[11] Patent Number: 5,634,096
[45] Date of Patent: May 27, 1997

[54] USING VIRTUAL DISKS FOR DISK SYSTEM CHECKPOINTING

[75] Inventors: Sandra J. Baylor, Ossining; Peter F. Corbett, Scarsdale; Blake G. Fitch, New Rochelle; Mark E. Giampapa, Irvington, all of N.Y.

[73] Assignee: International Business Machines Corporation, Armonk, N.Y.

[21] Appl. No.: 332,156

[22] Filed: Oct. 31, 1994

[51] Int. Cl.⁶ .................................................... G06F 11/10
[52] U.S. Cl. .................. 395/182.04; 395/182.13; 371/49.2
[58] Field of Search ...................... 395/180, 181, 395/182.03, 182.04, 182.09, 182.11, 182.13; 364/285.2, 267.3; 371/49.1, 50.1, 49.2

[56] References Cited

U.S. PATENT DOCUMENTS

| | | | |
|---|---|---|---|
| 3,736,566 | 5/1973 | Anderson et al. | 340/172.5 |
| 5,247,638 | 9/1993 | O'Brien | 357/425 |
| 5,271,013 | 12/1993 | Gleeson | 395/182.09 |
| 5,280,611 | 1/1994 | Mohan et al. | 395/600 |
| 5,317,739 | 5/1994 | Elko et al. | 364/228.3 |
| 5,418,916 | 5/1995 | Hall et al. | 364/243.4 |

*Primary Examiner*—Robert W. Beausoliel, Jr.
*Assistant Examiner*—Albert Decady
*Attorney, Agent, or Firm*—Robert P. Tassinari, Jr.

[57] ABSTRACT

A scheme is presented for storing data on disks in such a way that a checkpoint can easily be taken across several disks connected to different processors in a distributed or parallel computer. A checkpoint can be used to restore the entire disk system to a known state after one or more of the disks or processors fails. When a failure occurs, the disk system is restored to its state at the current checkpoint. The scheme allows significant saving in disk space by requiring that only the data modified since the last checkpoint be copied. The checkpointing algorithm is presented as part of the invention. The invention allows checkpointing of disk space independently of the use of the disk space, for example, in a file system.

13 Claims, 4 Drawing Sheets

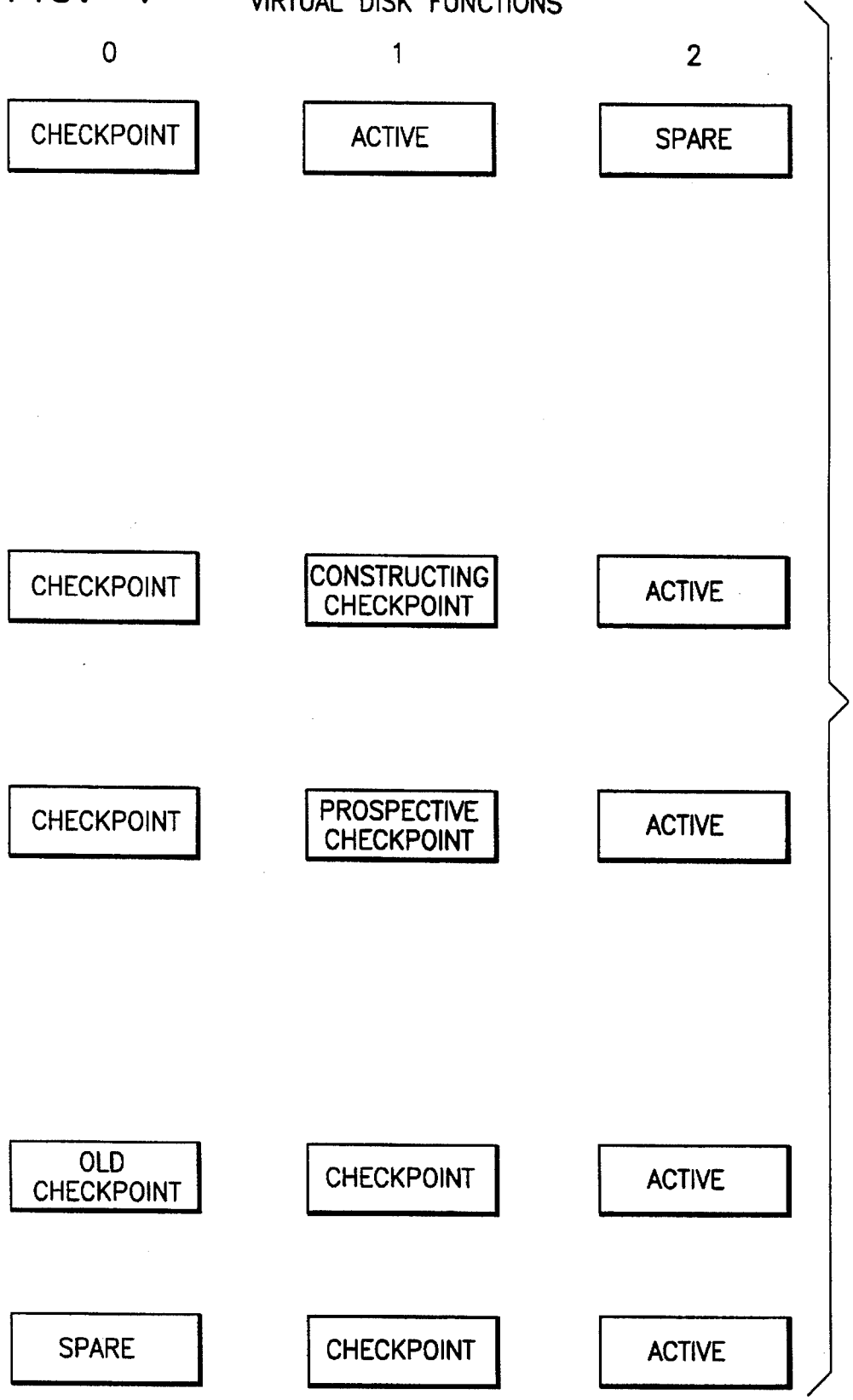
FIG. 4  VIRTUAL DISK FUNCTIONS

USING VIRTUAL DISKS FOR DISK SYSTEM CHECKPOINTING

FIELD OF THE INVENTION

The invention relates to parallel or distributed computing systems, and more particularly to a method for restoring lost data in such systems.

BACKGROUND OF THE INVENTION

In parallel or distributed computers, it is common to have one or more disks attached to each of several processors in the system. If the data on these distributed disks is organized in some distributed way, such that the data on the disks attached to one of the processors is logically dependent upon the data on disks attached to any other processor, then a failure of any processor or disk can result in the loss of data throughout the distributed disk system. Such interdependence of data stored on disks attached to different processors is typical in a parallel file system.

In a parallel computer, however, it is desirable to be able to restore data lost during a failure in the computer. According to the prior art, to do this requires redundant data storage across the processors, (e.g., Redundant Arrays of Inexpensive Disks). It is very difficult and expensive, however, to continually maintain such redundancy.

SUMMARY OF THE INVENTION

It is an object of the present invention to store data disk system checkpoints without copying all of the data stored in the disk system, and without requiring an auxiliary data storage system.

It is a further object of the invention to generate the redundant data without significantly affecting the overall system performance.

The present invention provides a method for taking checkpoints or "snapshots" of the global disk state, and for storing redundant information at those checkpoints. When a failure occurs, the computer can be returned to its most recent checkpoint, and any lost data can be restored from the redundant information stored with that checkpoint.

FIGURES

FIG. 4 shows the functional status of virtual disks at various points in the process of FIG. 3.

DETAILED DESCRIPTION OF THE PREFERRED EMBODIMENTS

Consider a parallel or distributed computer that has several Input/Output (IO) processors that have hard disk drives attached to them. Such drives are referred to as "physical disks". The aggregate disk space of all physical disks attached to an IO processor shall be referred to herein as a logical disk. The logical disk is physically realized by one or more physical disks. The user (i.e., the file system) of the disk storage system can not see the logical disk at an IO processor. Instead, the user sees one virtual disk at each IO processor. Several virtual disks are kept on each logical disk, as shown for example in FIG. 1. Each of the virtual disks on a logical disk is stored in a subset of the logical disk space. The space used by the various virtual disks can overlap, and it is desirable that they do overlap to some extent in order to make efficient use of logical disk storage space.

Each virtual disk on a given logical disk has a different function at any given time, as explained below. At a minimum, there is one virtual disk that performs the function of storing a part of a valid checkpoint of that IO processor's user virtual disk. Thus, there is a one-to-one space mapping between a virtual disk and logical disk space. According to the present invention, a complete checkpoint of the computer's disk system consists of the aggregate of all checkpoint virtual disks. That is, pieces of the checkpoint may be stored at a plurality of different locations. In accordance with the invention, the contents of a checkpoint virtual disk do not change between the time the checkpoint is constructed and the time it is replaced by a new checkpoint. A failure anywhere in the system will initiate a return to the state represented by this checkpoint.

The other function of virtual disks is to contain a (parity) constructing checkpoint (i.e., a checkpoint being prepared), and to contain the user disk space. The user disk space is the virtual disk visible to the user (i.e., the user programs) of the system. Ideally, each of these virtual disks occupies a significant fraction of the total logical disk space, thus maximizing the ratio of virtual to logical and physical disk space.

The function assigned to each virtual disk rotates among the virtual disks at the IO processor. The rotation of the virtual disk functions is coordinated by a distributed checkpointing algorithm which is also presented as part of this invention.

Figure 2:
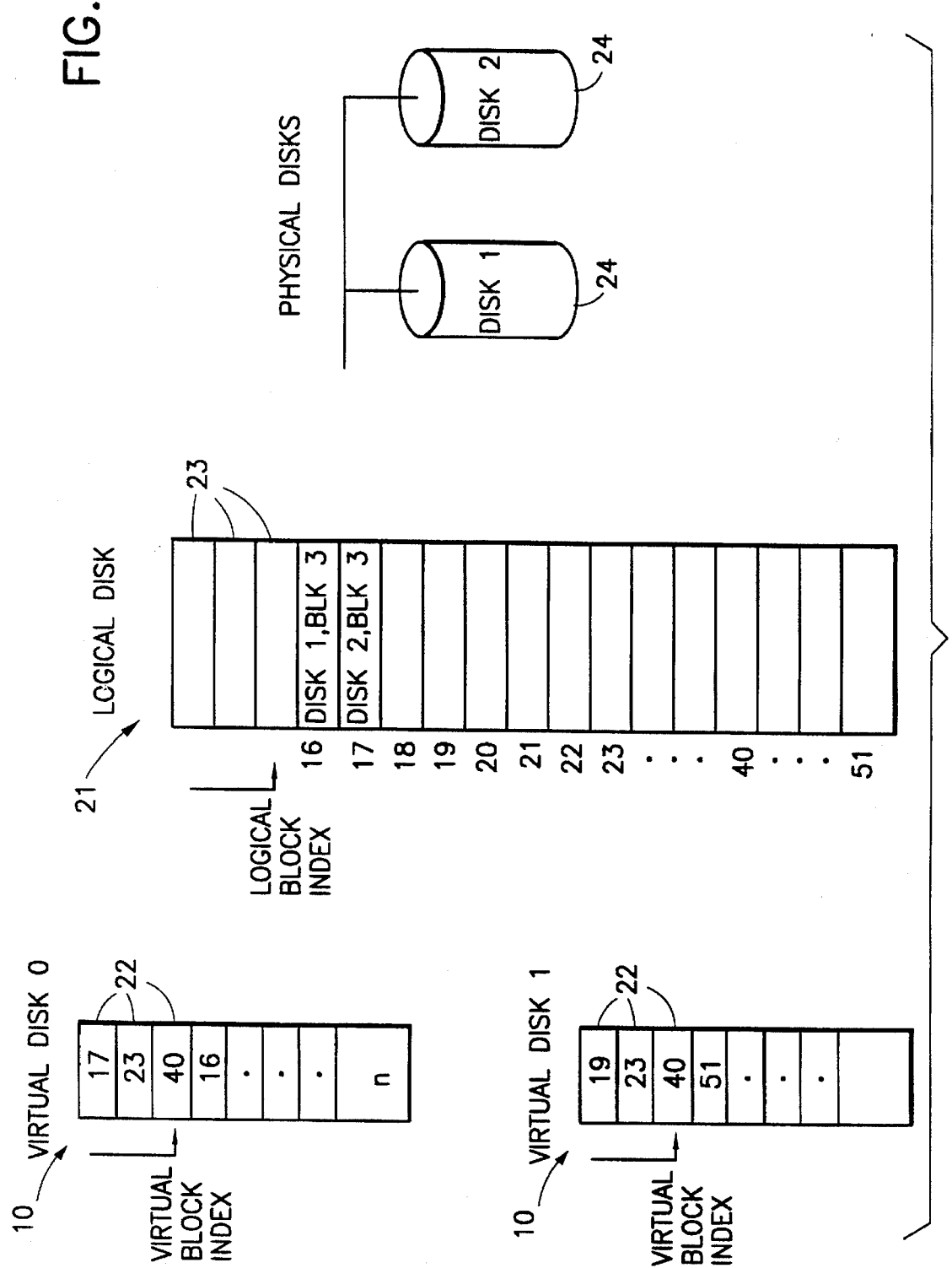
FIG. 2 depicts an example of the mapping from virtual to logical to physical disks in accordance with the invention.

The make-up of a virtual disk will now be explained. Referring to FIG. 2, a virtual disk 10 consists of many virtual data blocks 22. These virtual data blocks are mapped to addressed locations (logical data blocks) 23 in a logical disk 21. The addressed locations in the logical data block are in turn, mapped to physical data blocks on one or more physical disks 24. The virtual data blocks 22 of two different virtual disks 10 can map to the same logical data block 23 if the two virtual data blocks contain the same data and have the same virtual block number. Whenever the contents of two virtual data blocks differ, those virtual data blocks are mapped to different logical data blocks. Whenever a virtual data block exists on one virtual disk, but not on another, then a logical data block that is part only of the virtual disk containing that block is used.

According to one embodiment of the invention, a virtual disk can also contain parity blocks. These parity blocks are stored on the checkpoint virtual disk. These parity blocks contain redundant encodings of virtual data blocks belonging to parity groups distributed across several logical disks (i.e., across several IO processors). Each IO processor manages a unique logical disk. Parity groups can be assigned by any valid parity distribution function. For example, the first virtual block of a virtual disk on each of several logical disks may be assigned to a parity group. In that case, the encoded parity of those blocks might be stored in the first parity block of a virtual disk on yet another logical disk.

As stated above, a virtual disk is represented by a list of logical data block indices. Each index identifies a unique logical data block, or a NULL logical data block, i.e., an uninstantiated data block. There are as many virtual data blocks as there are elements in the list. The length of the list can be varied dynamically or can be preset as part of the disk system configuration. The list for each virtual disk is stored in a designated location on a physical disk. This space is reserved, and is not part of the logical disk space. In a preferred embodiment, the up-to-date list for each virtual disk is also cached in the IO processor's memory. To access a particular virtual block, the virtual block address is used to index into the list representing the virtual disk being used. The number stored at this address in the virtual disk is the address of the logical block that contains the data. Looking up the same virtual block address in another virtual disk list will yield the same logical block address only if the data in the two virtual blocks is identical.

As an example, a file can be represented by a list of virtual block addresses (as in a Unix inode). If two virtual disks are identical, then the logical block addresses stored in the two virtual disks are also identical. In this case, the actual file data is stored only once on the logical and physical disks. If two virtual disks differ by one or more blocks, then the inode can still be used to represent the file in both virtual disks, and need only contain one entry for each block. However, the two virtual disks will contain different logical data block addresses to the extent their data contents differ, and the differing data blocks will be stored in separate locations in the physical disk(s).

The method for disk system checkpointing will now be described in detail. In this preferred method, checkpoints are continuously rotated among three virtual disks at each IO processor. It will be understood by those skilled in the art, however, that checkpoints could also be rotated among four or more virtual disks without departing from the scope of the invention. This would allow more than one disk system checkpoint to be stored at all times.

Figure 1:
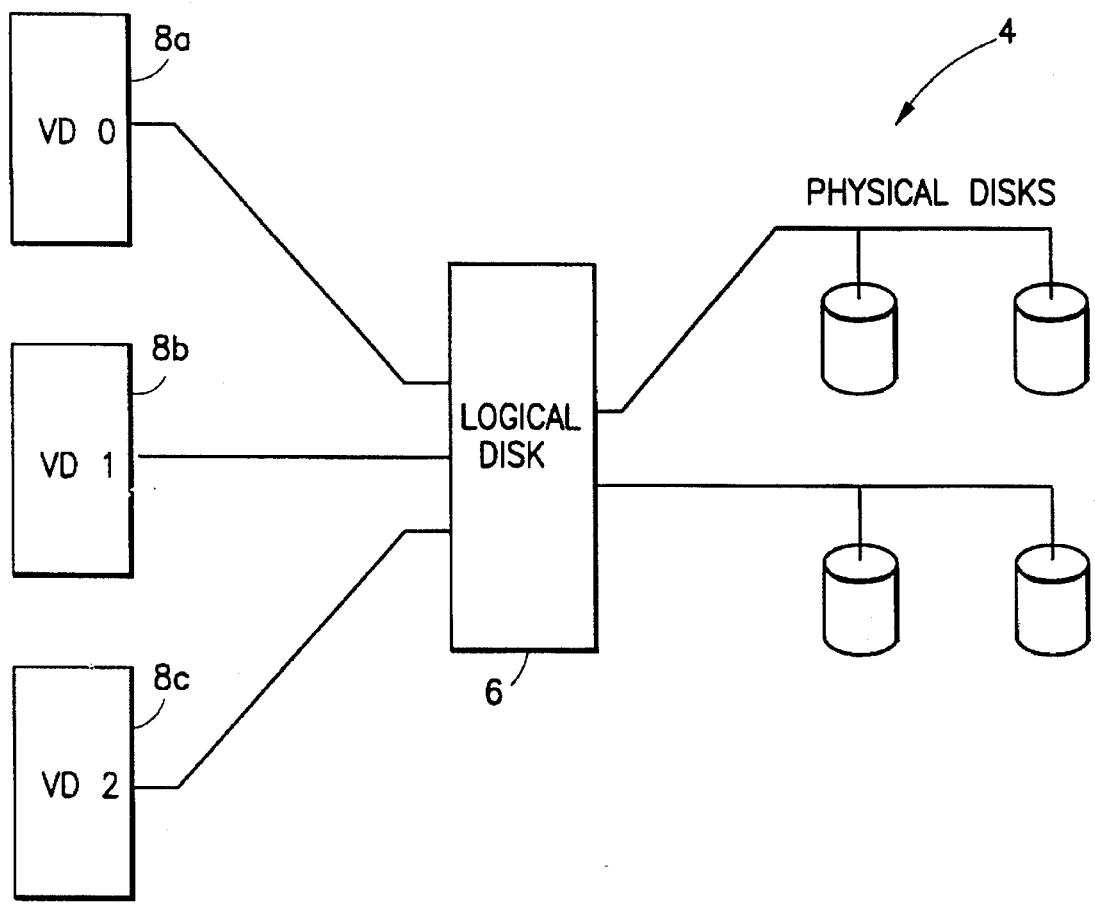
FIG. 1 depicts the organization of virtual, logical and physical disks in accordance with the invention.

The system of FIG. 1 is shown as employing three virtual disks, numbered VD0, VD1, and VD2, each of which is assigned to a different IO processor (not shown). Assume initially that for each IO processor, virtual disk VD0 contains a valid checkpoint, virtual disk VD1 contains the user disk seen by the user of the computer, and virtual disk VD2 is not in use. A single global atomic variable contains a modulo 3 counter that designates the virtual disk that stores the valid checkpoint for each IO processor. This ensures that there is never any ambiguity about which of the virtual disks for an IO processor contains the checkpoint to be returned to in the event of a failure. If virtual disk VD0 is assigned as the checkpoint virtual disk, it is because the value of the modulo 3 counter is 0.

Upon occurrence of a failure, the system is returned to its state at the valid checkpoint and any lost data blocks are reconstructed in the valid checkpoint virtual disk using parity blocks (as described later). It may be necessary to reconstruct an entire virtual disk that belonged to a failed IO processor, depending upon the degree to which the virtual disk was altered since the last checkpointing. As part of this reconstruction, new parity blocks will be generated if necessary to redundantly represent the reconstructed data. Thus, the system will very quickly be able to tolerate a subsequent fault.

The computer is returned to the reconstructed checkpoint state in the following manner. A user virtual disk's block list for a given IO processor is replaced with the block list of its checkpoint virtual disk. Where the checkpoint virtual disk is VD0, this is accomplished by copying the data block portion of VD0's block list into VD1's block list. It is not necessary to copy the parity portion of VD0's block list, since the user virtual disk does not contain parity data. Nor is it necessary to copy any data blocks of the user virtual disk; the state of the user disk at the time of the failure is discarded.

Under normal, failure-free operation, the checkpoint virtual disk is held constant for the entire time that it is part of the current checkpoint, while the user virtual disk is changed as the user modifies the data stored in the disk system. The contents of the two virtual disks gradually diverge, and accordingly the block list of the user disk gradually becomes increasingly different from that of the checkpoint disk. When it is desired to take a new checkpoint, the following procedure is performed, as shown in the flow chart of FIG. 3.

Figure 3:
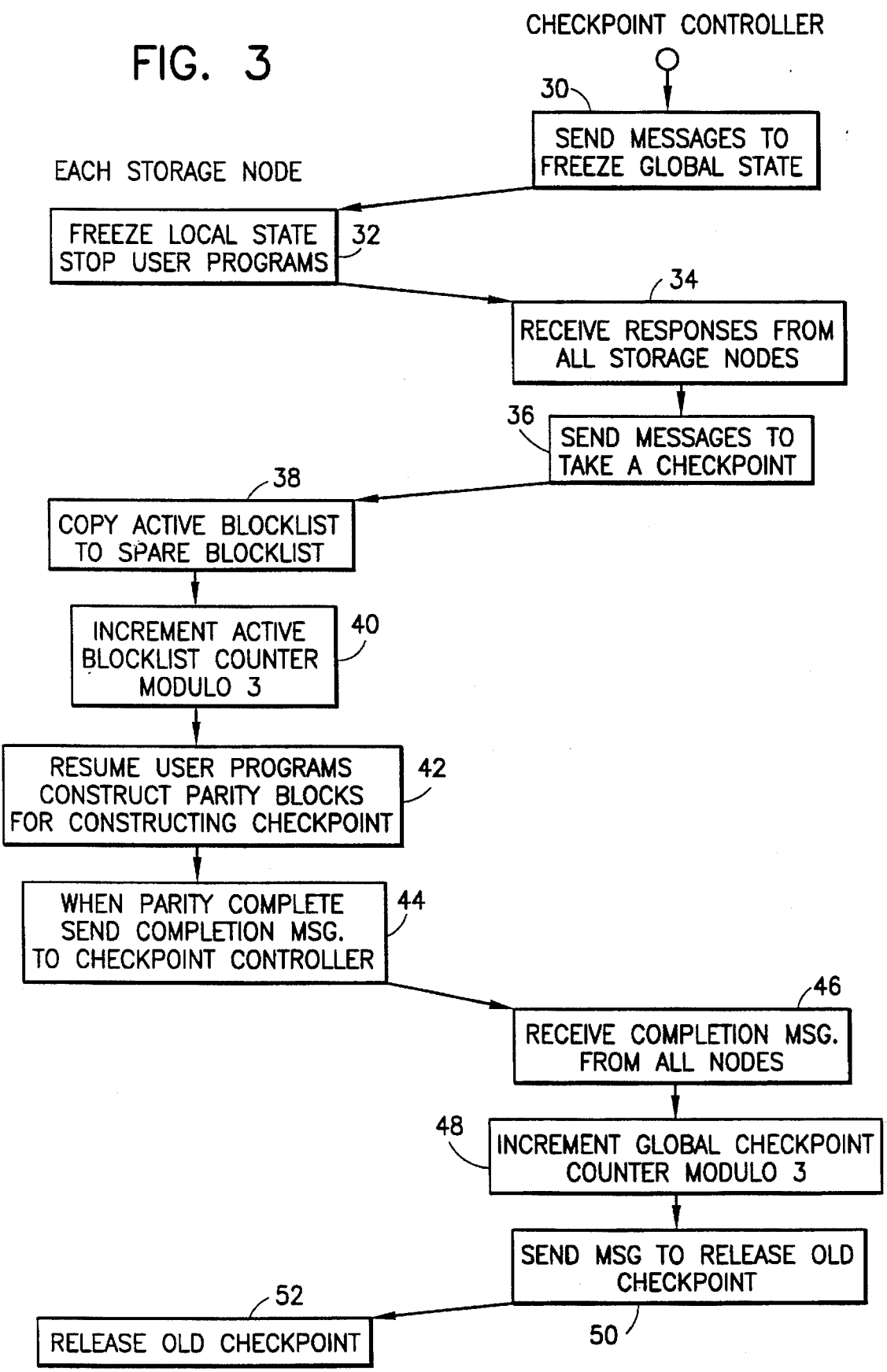
FIG. 3 is a flow diagram of the method of the present invention.

First, the contents of each user virtual disk is frozen in a globally consistent state. FIG. 3, block 30. This globally consistent state must be established by the checkpoint algorithm, and the details of how this is done are beyond the scope of this invention. In a preferred embodiment, there is one thread, a global checkpoint controller, running in the computer that controls the distributed checkpointing operation. In block 32, the state of each storage node is frozen and user programs are stopped. Once a globally consistent state has been established as indicated from the responses from each storage node, FIG. 3, block 34, the global checkpoint controller sends a message to each of the IO processors, instructing them to take a new checkpoint of their user virtual disks. FIG. 3, block 36. Upon receipt of this message at each IO processor, the block list of the user virtual disk (assumed initially to be VD1) is copied into the block list of a spare virtual disk (assumed initially to be VD2). FIG. 3, block 38. A local modulo three counter, the setting of which designates the user virtual disk, is incremented to point to virtual disk VD2, and VD2 becomes the user virtual disk. FIG. 3, block 40. The user is then allowed to resume execution out of the new user virtual disk VD2. FIG. 3, block 42. At the same time, the IO processor can construct a new checkpoint in the former user virtual disk VD1. It does this in concert with the other IO processors by generating parity blocks and storing them in locations according to the global parity distribution function. The parity blocks making up the parity set are stored across several checkpoint virtual disks.

Parity blocks are generated as follows. Depending upon the desired parity scheme (even, odd, etc.), the corresponding blocks of each constructing checkpoint virtual disk are, for instance, XOR'ed to obtain a parity for that set of blocks. This is repeated for each group of corresponding blocks. The generated parity blocks are then stored across the constructing virtual disks.

Once the IO processor has completed its portion of the parity generation, the checkpoint virtual disk VD1 for a given IO processor will contain a portion of a new global checkpoint. Notification of this is sent to the global checkpoint controller. FIG. 3, block 44. When the global checkpoint controller receives notification from all IO processors that they have finished their portion of the checkpoint generation, (including parity generation) FIG. 3, block 46, it will increment the global counter that designates the checkpoint virtual disk. FIG. 3, block 48. This is done in only one place in the entire system, but changes the designation of the checkpoint virtual disk at each IO processor. As a result, each VD1 will contain the valid checkpoint to be used for restoration in the event of system failure. After incrementing the checkpoint counter, the checkpoint controller sends a message to each IO processor telling it that a new checkpoint is now in effect. FIG. 3, block 50. Upon receipt of this message, each IO processor is free to designate the former checkpoint disk VD0 as a spare disk, and to free the logical blocks used by that VD0 if they are not used by any other virtual disk. FIG. 3, block 52.

FIG. 4 shows the designated status of the virtual disks at significant points in the process depicted in FIG. 3.

At the conclusion of the cycle shown in FIG. 3, VD0 at each IO processor is designated as a spare, VD1 contains a valid checkpoint, and VD2 represents the user virtual disk. Each subsequent checkpoint will cycle sequentially through the virtual disks. The functions (spare, checkpoint, constructing checkpoint and user virtual disk) assigned to each of the virtual disks, therefore, rotate through the three virtual disks on each checkpoint iteration.

It should also be noted that the method described herein can easily be reformulated to provide checkpointing of disks using slightly different combinations of virtual disks and sequences of virtual disk functions. For example, another formulation of the algorithm rotates the checkpoints among four virtual disks. Whatever the number of virtual disks, the essential aspects of the algorithm presented are that the roles of the individual virtual disks change at each iteration of the checkpointing algorithm, and that the current checkpoint virtual disk is selected by a single global atomic counter in the system. Further, while the preceding discussion preferably uses magnetic disks as the storage media with which the invention can be implemented, the invention can be applied to any distributed storage system.

Another preferred embodiment of the invention will now be described. This has been implemented as part of a Vesta file system. For a description of the Vesta system, see "Overview of the Vesta Parallel File System" by Peter F. Corbett, Sandra Johnson Baylor and Dror G. Feitelson, published at the International Parallel Processing Symposium, Workshop on Parallel I/O, April 1993, Newport Beach, Calif. and reprinted in ACM Computer Architecture News, Vol. 21 No. 5 pages 7–14, December 1993, incorporated herein by reference. For each file, two block lists are maintained, one for the active version of the file, and one for the checkpoint version of the file. When a user wants to take a checkpoint of a file, a scheduling token is passed among the Vesta storage nodes to schedule the file checkpoint operation. The Vesta system employs a protocol, beyond the scope of this invention, that ensures that the checkpoint operation is conducted in the same relative sequence as all other operations on that file at each node. When the checkpoint operation is performed on a given node, the entire block list of the active version of the file is copied to the checkpoint block list, overwriting any pre-existing checkpoint of the file. At the same time, any blocks of the previous checkpoint version of the file that are no longer used are de-allocated. Subsequently, if any portion of the active file is overwritten, new logical blocks must be allocated for those portions of the file data. The old data is written to the new block, and then the new data overwrites those portions of the block that are being rewritten.

Thus, the checkpointed file and the new, active file eventually may require as much as double the disk space they would require without checkpointing. However, there is no immediate cost in physical disk space to taking a checkpoint of a file, because at the time of initial checkpointing, the active file and the checkpointed file will be the same.

In the case where a system failure has occurred, or the user for some reason wishes to return the active file to its checkpointed state, the checkpoint block list is copied onto the active block list of the file. Any logical blocks of the active block list that are no longer used may be de-allocated. Vesta also includes a function for deleting a checkpoint version of a file. In this case, no block list is copied, but the checkpoint block list is cleared, and any blocks of the checkpoint version that were not common to the active version are de-allocated.

It is important to note that a user who is overwriting an active file after establishing a checkpoint will not expect to run out of disk space, because from their perspective they are simply reusing disk space already allocated to the file. However, since the checkpoint and the active version of the file together will require additional logical disk space where the files differ, it is possible that the total amount of logical disk space could be exhausted by a write to a previously existing portion of the file. For this reason, Vesta can be instructed (through a "cautious mode flag" setting) to keep a strict accounting of the disk space used by files, including the total space needed to store completely different active and checkpoint versions of files that are checkpointed. If the "cautious mode flag" is set, Vesta guarantees that all disk space required to completely overwrite the checkpointed version of the active file will be available. It does this by maintaining a count of blocks used by each file, and blocks reserved for each file. It also keeps a count of total blocks used by the entire file system, and total blocks reserved in the entire file system. The accounting system operates as follows.

When a file is checkpointed with the cautious mode flag set, the total blocks used by the file, and the total blocks used by the system are unmodified. However, the number of blocks reserved for the file is set to the current number of blocks in the file (which is the size of both the active and checkpoint versions at this time). The total blocks reserved by the system is incremented by this same amount. If the total blocks reserved by the system and the total blocks used by the system now exceeds the total blocks available in the system, the checkpointing is not allowed to proceed.

When a block of the active file is overwritten, the blocks used by the file and the total blocks used by the system are incremented, and the remaining blocks reserved for the active file and the total remaining blocks reserved by the system are decremented. When a checkpoint is deleted, the blocks uniquely used by the checkpoint are de-allocated, the counts of blocks used by the file and blocks used by the system are decremented, and the count of blocks reserved for the system is decremented by the current count of blocks reserved for the active file. The number of blocks reserved for the active file is reset to zero.

This accounting procedure ensures that there will be sufficient disk space to completely overwrite all existing portions of all checkpointed files. It has the disadvantage of effectively consuming disk space for checkpoints, even if checkpointed files are never completely overwritten. Turning the cautious mode flag off eliminates the logical disk space reservation mechanism. It is a policy decision whether to reserve space for checkpointed files or not.

An alternative to the above-described scheme (as described in the prior art) is to take checkpoints by copying all disk data to a backup area, either on the same disks or on an auxiliary storage system. This requires that at most half the total disk space can be used. Furthermore, copying the data takes time, and the computer is not available to the user while the copying is taking place.

While the invention has been described in particular with respect to specific embodiments thereof, it will be understood that modification in form and detail may be made without departing from the scope of the invention. For instance, the invention can also be applied within disk arrays or among distributed collections of disk arrays, such as the IBM 9570 Disk Array.

What is claimed:

1. A method of checkpointing lost data in a multiprocessor, distributed disk array computer system to protect against losing data, comprising:

provising a logical disk representing the data stored on one or more physical disks associated with each processor of the multiprocessor system;

assigning to each of the processors a set of virtual disks, the virtual disks being mapped via the logical disk to data storage locations on the physical disks;

designating one virtual disk in each set to be a user virtual disk, and updating the data stored in the user virtual disk when desired;

designating another of the virtual disks in each set to be a checkpoint virtual disk, the checkpoint virtual disks containing most recent checkpoint data and parity blocks for reconstructing the checkpoint data in the event of a physical disk failure;

designating another of the virtual disks in each set to be a constructing checkpoint virtual disk, the constructing checkpoint virtual disk containing data desired to be saved as checkpoint data;

constructing new parity blocks derived from the data desired to be saved as checkpoint data in the constructing checkpoint virtual disks;

when the new parity blocks have been constructed, assigning the constructing checkpoint virtual disks to be new checkpoint virtual disks, and assigning the checkpoint virtual disks to be spare virtual disks, or saving them as a finite sequence of checkpoints in additional virtual disks.

2. A method of restoring lost data in a multiprocessor system having checkpointed data in accordance with claim 1, comprising:

when a system failure occurs, reassigning the checkpoint virtual disks to be the user virtual disks, whereby to restore the system to its state as of the time of a most recent checkpointing operation.

3. The method of claim 1, wherein each set of virtual disks comprises three virtual disks.

4. The method of claim 1, wherein each set of virtual disks comprises at least four virtual disks.

5. A method of checkpointing data stored on one or more storage devices in a computer employing a plurality of processors and a plurality of distributed disk storage devices, comprising the steps of:

classifying all storage space associated with the processors as one or more logical disks;

assigning a plurality of virtual disks to a processor, the virtual disks together comprising a subset of the logical disks;

assigning functions to the virtual disks of each processor such that each function is assigned to one or more virtual disks of each processor;

storing a checkpoint of the distributed disk system in one or more virtual disks, portions of the checkpoint being distributed among one or more of the virtual disks, wherein the checkpoint represents the state of the distributed disk system at a particular time;

periodically updating the checkpoint.

6. The method of claim 5, wherein the functions comprise: user virtual disk, checkpoint virtual disk and constructing checkpoint virtual disk.

7. The method of claim 6, wherein the functions further comprise spare virtual disk.

8. The method of claim 5, wherein the step of periodically updating comprises:

using a single process thread to coordinate the update of the checkpoint;

using a single global modulo counter to indicate the virtual disk containing the most recent valid checkpoint.

9. The method of claim 8, wherein the step of updating further comprises:

using a single global thread:

causing the local state of each processor to be frozen;

initiating a checkpointing operation on each of the processors;

upon determining that each processor has completed its checkpointing operation, incrementing the global checkpoint counter to change the assignment of the checkpoint;

instructing each processor to release its old checkpoint.

10. The method of claim 9, wherein the step of taking a local checkpoint comprises:

copying the block list of an active virtual disk to a spare virtual disk;

incrementing a local active block list modulo counter to change the virtual disk assigned to be the user virtual disk;

resuming user programs using the new user virtual disk;

constructing parity blocks for constructing a checkpoint virtual disk;

when parity block construction is complete, indicating to the local checkpoint thread that the local checkpoint construction is complete.

11. A method of constructing a checkpoint in a multiprocessor system, comprising:

maintaining a first block list corresponding to a group of blocks stored in memory for an active version of a file;

creating a second block list, identical to the first block list, and maintaining the second block list as a checkpoint;

modifying data in the first group of blocks, comprising the steps of:

copying data residing in a first disk location to a new disk location;

overwriting some or all of the data in the new disk location with new data;

replacing the entry in the first block list which corresponds to the first disk location with the address of the new disk location;

accounting for the number of blocks addressed by the first and second block lists, comprising the steps of:

providing used and reserved block counters, and a maximum limit for the processor;

for each file, providing a new block counter and a reserved block counter;

setting the used block counter of each file to be the union of blocks used by the checkpoint and user block lists;

setting the reserved block counter of each file to be equal to the number of blocks in the checkpoint block list that are not also in the user block list of the file;

when a block of the user block list is overwritten, incrementing the used block counter of that file and of the system by one and decrementing the reserved block counter of that file and of the system;

setting the total number of used blocks to be equal to the sum of the used block counts for each file;

setting the total number of reserved blocks to equal the sum of reserved block counts of each file;

maintaining the counters when files are deleted, overwritten, resized or checkpointed.

12. A method of reconstructing lost data in a system employing the checkpoint constructing method of claim 11, comprising:

overwriting the first block list with the entire second block list;

deallocating any blocks in the first block list not overwritten in the copying step.

13. The method of claim 6, further comprising:

if taking a checkpoint or extending a file would result in the sum of the system reserved and used counters exceeding the maximum limit, disallowing the checkpointing or extending operation.

* * * * *